(12) United States Patent
Kidachi

(10) Patent No.: US 9,992,939 B2
(45) Date of Patent: Jun. 12, 2018

(54) EMITTER AND DRIP IRRIGATION TUBE

(71) Applicant: Enplas Corporation, Saitama (JP)

(72) Inventor: Masahiro Kidachi, Saitama (JP)

(73) Assignee: ENPLAS CORPORATION, Saitama (JP)

( * ) Notice: Subject to any disclaimer, the term of this patent is extended or adjusted under 35 U.S.C. 154(b) by 7 days.

(21) Appl. No.: 15/037,976

(22) PCT Filed: Nov. 26, 2014

(86) PCT No.: PCT/JP2014/081152
§ 371 (c)(1),
(2) Date: May 19, 2016

(87) PCT Pub. No.: WO2015/080115
PCT Pub. Date: Jun. 4, 2015

(65) Prior Publication Data
US 2016/0295816 A1    Oct. 13, 2016

(30) Foreign Application Priority Data

Nov. 27, 2013 (JP) .................. 2013-245228
Oct. 7, 2014 (JP) .................. 2014-206476

(51) Int. Cl.
A01G 25/16     (2006.01)
A01G 25/02     (2006.01)
B05B 12/08     (2006.01)

(52) U.S. Cl.
CPC .......... *A01G 25/023* (2013.01); *A01G 25/16* (2013.01); *A01G 25/02* (2013.01); *A01G 25/165* (2013.01); *B05B 12/088* (2013.01)

(58) Field of Classification Search
CPC ...... A01G 25/02; A01G 25/023; A01G 25/16; A01G 25/165; B05B 12/088
(Continued)

(56) References Cited

U.S. PATENT DOCUMENTS 4,210,287 A * 7/1980 Mehoudar ............ A01G 25/023
239/542
4,369,923 A * 1/1983 Bron ..................... B05B 1/3006
239/533.1
(Continued)

FOREIGN PATENT DOCUMENTS

| EP | 444425 A1 | 9/1991 |
|----|-----------|--------|
| EP | 2594339 A1 | 5/2013 |
| JP | 2010-046094 A | 3/2010 |

OTHER PUBLICATIONS

Extended European Search Report for 14866332.1 dated Jun. 13, 2017.
(Continued)

*Primary Examiner* — Darren W Gorman
*Assistant Examiner* — Joseph A Greenlund
(74) *Attorney, Agent, or Firm* — Brundidge & Stanger, P.C.

(57) ABSTRACT

An emitter (120) is arranged inside a tube and is constituted by a resin molded body that has at least a recessed part and a through hole. The emitter (120) has a screen part, an intake volume adjusting part, a pressure reducing part, a discharge volume adjusting part, and a discharge part. The screen part is constituted by a slit (301) and a recessed part that intersects the slit (301) when seen in plan view. The discharge part includes an infiltration preventing part that is for preventing the infiltration of foreign matter from the discharge opening of the tube.

9 Claims, 8 Drawing Sheets

(58) Field of Classification Search
USPC .............................................. 239/542, 533.1
See application file for complete search history.

(56) References Cited

U.S. PATENT DOCUMENTS

| | | | |
|---|---|---|---|
| 4,687,143 A | 8/1987 | Gorney et al. | |
| 5,829,686 A * | 11/1998 | Cohen | A01G 25/023 239/533.1 |
| 6,027,048 A * | 2/2000 | Mehoudar | A01G 25/023 138/42 |
| 6,302,338 B1 * | 10/2001 | Cohen | A01G 25/023 239/542 |
| 6,382,530 B1 * | 5/2002 | Perkins | A01G 25/023 239/542 |
| 6,945,476 B2 * | 9/2005 | Giuffre | A01G 25/023 239/542 |
| 7,648,085 B2 * | 1/2010 | Mavrakis | A01G 25/023 138/40 |
| 7,735,758 B2 * | 6/2010 | Cohen | A01G 25/023 239/542 |
| 8,096,491 B2 * | 1/2012 | Lutzki | F16K 23/00 239/533.1 |
| 8,302,887 B2 * | 11/2012 | Park | A01G 25/023 239/542 |
| 8,511,585 B2 * | 8/2013 | Keren | A01G 25/023 239/542 |
| 8,882,004 B2 * | 11/2014 | Gorney | A01G 25/023 239/542 |
| 8,998,113 B2 * | 4/2015 | Keren | A01G 25/023 239/542 |
| 9,307,705 B2 * | 4/2016 | Akritanakis | A01G 25/023 |
| 9,345,205 B2 * | 5/2016 | Kidachi | A01G 25/023 |
| 2003/0029937 A1 * | 2/2003 | Dermitzakis | A01G 25/023 239/542 |
| 2005/0224607 A1 * | 10/2005 | Dinur | G05D 7/0113 239/542 |
| 2005/0284966 A1 * | 12/2005 | DeFrank | A01G 25/023 239/542 |
| 2007/0108318 A1 * | 5/2007 | Mamo | A01G 25/023 239/542 |
| 2009/0173811 A1 | 7/2009 | Gorney et al. | |
| 2009/0212135 A1 | 8/2009 | Keren | |
| 2009/0266919 A1 | 10/2009 | Mavrakis et al. | |
| 2012/0160926 A1 * | 6/2012 | Lutzki | F16K 23/00 239/11 |
| 2012/0256017 A1 | 10/2012 | Gorney et al. | |
| 2012/0305676 A1 | 12/2012 | Keren | |
| 2013/0248622 A1 * | 9/2013 | Kim | B29C 47/0038 239/542 |
| 2015/0041563 A1 * | 2/2015 | Ensworth | A01G 25/023 239/542 |
| 2016/0219802 A1 * | 8/2016 | Ensworth | A01G 25/023 |
| 2016/0286742 A1 * | 10/2016 | Kidachi | A01G 25/023 |
| 2016/0295816 A1 * | 10/2016 | Kidachi | A01G 25/023 |
| 2016/0309669 A1 * | 10/2016 | Kidachi | A01G 25/02 |

OTHER PUBLICATIONS

International Search Report from International Application No. PCT/JP2014/081152 dated Mar. 3, 2015.

* cited by examiner

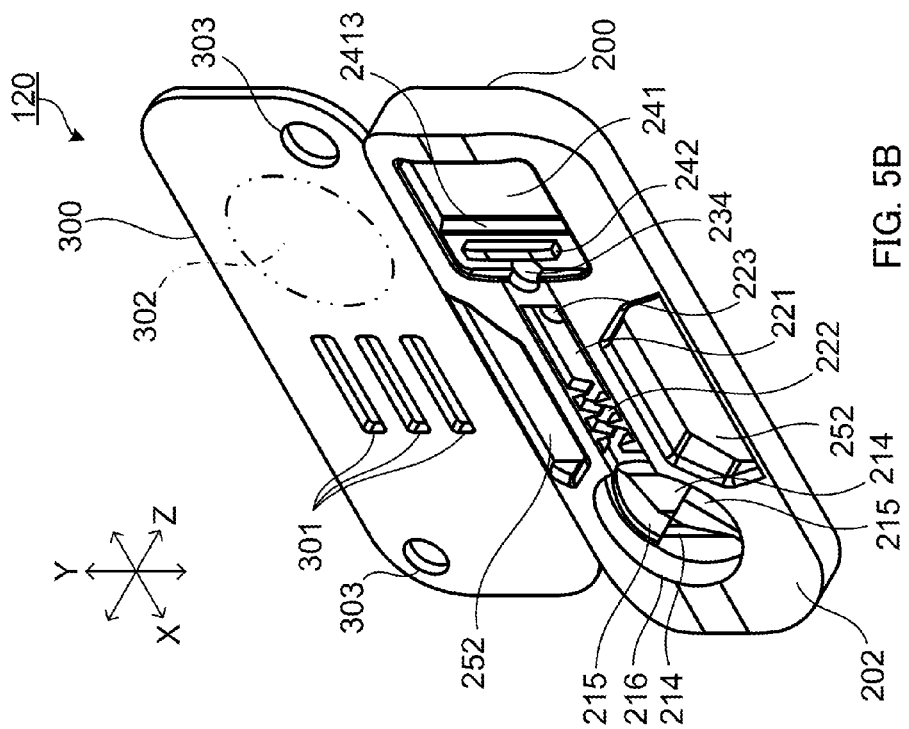
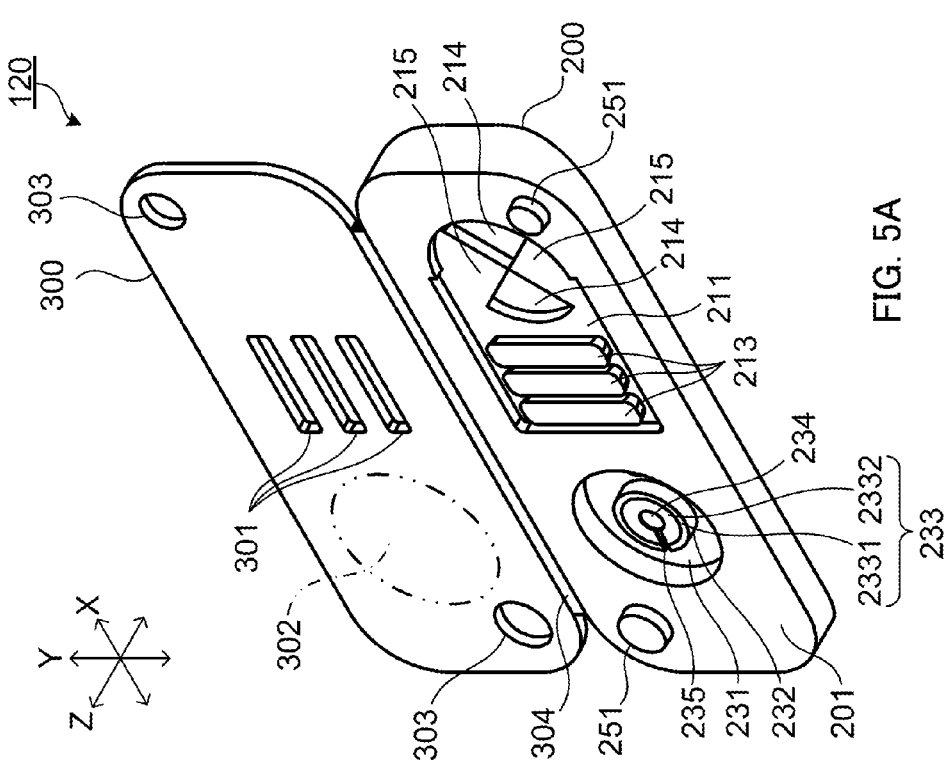
FIG. 5A
FIG. 5B

EMITTER AND DRIP IRRIGATION TUBE

TECHNICAL FIELD

The present invention relates to an emitter and a trickle irrigation tube including the emitter.

BACKGROUND ART

A trickle irrigation method is known as a method for culturing plants. In the trickle irrigation method, for example, a trickle irrigation tube is disposed on the soil in which plants are planted, and irrigation liquid such as water and liquid fertilizer is slowly supplied from the trickle irrigation tube to the soil. The trickle irrigation method can minimize the consumption amount of the irrigation liquid, and has been increasingly attracting attention in recent years.

The trickle irrigation tube typically has a tube and an emitter (also called "dripper"). The emitter typically supplies the soil with the irrigation liquid in the tube at a predetermined rate at which the irrigation liquid is dropped to the soil. Emitters which are pierced into the tube from the outside, and emitters joined to the inner wall surface of the tube are known.

For example, the latter emitter has a channel including a pressure reduction part for allowing the liquid having entered the emitter from the internal space of the tube to flow toward the through hole of the tube while reducing the pressure of the liquid, and a diaphragm part configured to change the volume of a portion of the channel where the irrigation liquid having reduced pressure flows in accordance with the pressure of the liquid of the space. The emitter is composed of a member which is joined to the inner wall surface of the tube, a member which is disposed on the member joined to the inner wall surface, and a diaphragm part which is disposed between the two members. The diaphragm part is composed of an elastic film such as a silicone rubber film (see, for example, PTL 1).

The emitter can suppress variation of the discharge rate of the irrigation liquid regardless of change of the pressure of the liquid in the internal space of the tube. Therefore, the emitter is advantageous from the viewpoint of uniformly growing multiple plants.

CITATION LIST

Patent Literature

PTL 1
Japanese Patent Application Laid-Open No. 2010-46094

SUMMARY OF INVENTION

Technical Problem

The emitter is formed by assembling three components. In view of this, the emitter may cause assembling error. In particular, the assembling error of the diaphragm part may cause variation of the operation of the diaphragm part, and variation of the discharge rate of the irrigation liquid.

In addition, the emitter is typically a molded article of an inexpensive resin such as polyethylene and polypropylene, and the diaphragm part is composed of a more expensive elastic material such as a silicone rubber film. The use of components of different materials has a room for improvement in material cost reduction.

Further, in the case of a trickle irrigation tube, hundreds of emitters are disposed in one tube in some cases. In the case of a long trickle irrigation tube, the supply pressure of the liquid to the tube is required to be increased. However, when liquid flows out from the emitter before the pressure of the liquid in the tube is sufficiently increased, the pressure of the liquid in the tube is not easily increased, and discharge rate of the liquid in the emitter may be unstable. Meanwhile, when the discharge rate of the liquid of the emitter increases as the pressure of the liquid in the tube increases, the discharge rate of the emitters disposed on the upstream side of the tube increases, and the discharge rate of the emitters disposed on the downstream side may become insufficient. In view of this, appropriate control of the discharge rate of the liquid of the emitter in accordance with the pressure of the liquid in the tube is desired.

Further, in general, the channel in the emitter is narrow, and even when small foreign matters intrude the channel, the discharge rate of the liquid from the emitter may become insufficient. In view of this, effective measures against foreign matters in the liquid received by the emitter and foreign matters which intrude from the discharge port of the tube have been desired. Furthermore, from the viewpoint of reducing the material cost and the manufacturing cost of the emitter, an emitter which can be manufactured with a single inexpensive material and fewer number of components is desired.

An object of the present invention is to provide an emitter which can stabilize the discharge rate of the irrigation liquid and can further reduce the manufacturing cost. In addition, another object of the present invention is to provide a trickle irrigation tube having the emitter.

Solution to Problem

The present invention provides an emitter for quantitatively discharging irrigation liquid in a tube for distributing the irrigation liquid from a discharge port communicating between an inside and an outside of the tube when the emitter is joined to an inner wall surface of the tube at a position corresponding to the discharge port, the emitter being composed of a resin molded body including at least a recess and a through hole, the emitter including: an intake part for receiving the irrigation liquid in the tube; a liquid receiving amount regulating part for regulating a flow rate of the irrigation liquid received from the intake part in accordance with a pressure of the irrigation liquid in the intake part; a pressure reduction part for allowing the irrigation liquid supplied from the liquid receiving amount regulating part to flow therethrough while reducing the pressure of the irrigation liquid; a discharge rate regulating part for regulating the flow rate of the irrigation liquid supplied from the pressure reduction part in accordance with a pressure of the irrigation liquid in the tube; and a discharge part to which the irrigation liquid, having a flow rate controlled by the discharge rate regulating part, is supplied, the discharge part being to be facing the discharge port, in which: the intake part includes a screen part for catching a floating material in the irrigation liquid, the screen part includes: a slit which opens to inside of the tube, a recess which is in communication with the slit and extends in a direction intersecting with a longitudinal direction of the slit, and the discharge part includes an intrusion prevention part for preventing intrusion of foreign matter from the discharge port.

In addition, the present invention provides a trickle irrigation tube which includes: a tube, and at least one emitter disposed on the tube, the emitter being the above-mentioned emitter.

Advantageous Effects of Invention

The emitter according to the present invention controls the inflow amount of the irrigation liquid to the emitter in accordance with the pressure of the irrigation liquid in the trickle irrigation tube, and thus can stabilize the discharge rate of the irrigation liquid of the emitter. In addition, since the emitter according to the present invention can be formed with one or two components by injection molding of a resin material, the manufacturing cost can be further reduced in comparison with conventional emitters composed of three parts.

BRIEF DESCRIPTION OF DRAWINGS

FIG. 5A illustrates a top surface, a front surface and a side surface of a molded article in a state before a film is joined to an emitter main body in the embodiment, and FIG. 5B illustrates a bottom surface, a front surface and a side surface of the molded article;

DESCRIPTION OF EMBODIMENTS

Figure 1A:
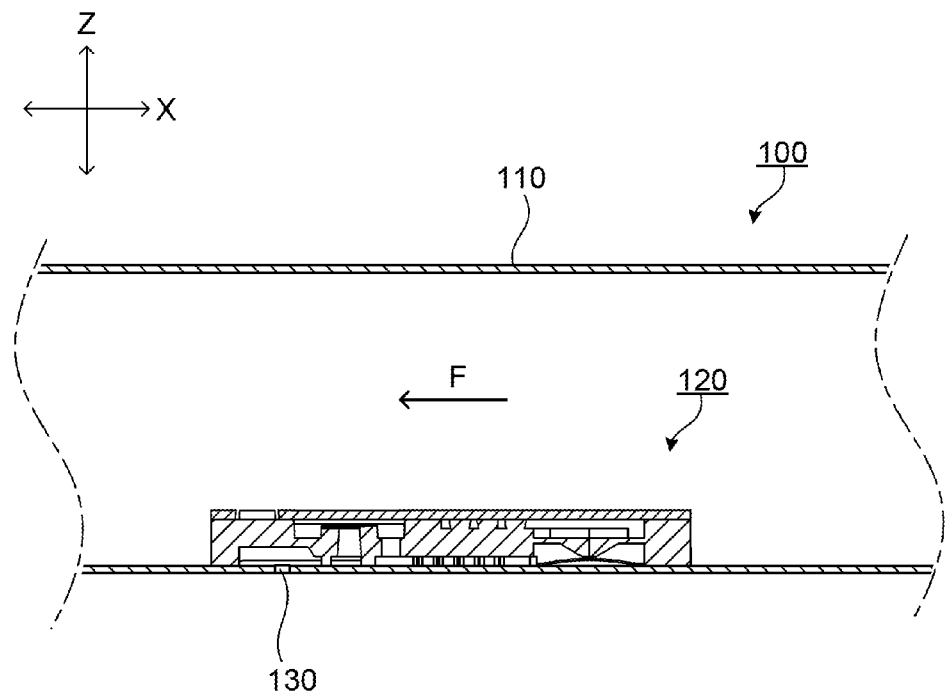
FIG. 1A is a schematic longitudinal sectional view of a trickle irrigation tube according to an embodiment of the present invention.
Figure 1B:
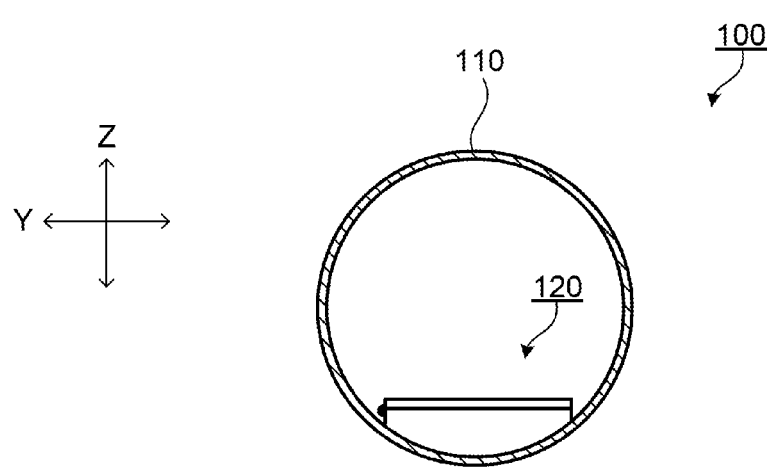
FIG. 1B is a schematic lateral sectional view of the trickle irrigation tube.

In the following, an embodiment of the present invention is described in detail with reference to the accompanying drawings. FIG. 1A is a schematic longitudinal sectional view of the trickle irrigation tube according to the embodiment of the present invention, and FIG. 1B is a schematic lateral sectional view of the trickle irrigation tube. Trickle irrigation tube 100 is composed of tube 110 and emitter 120. Tube 110 is made of polyethylene, for example.

Emitter 120 is disposed at a predetermined interval (for example, 200 to 500 mm) in the axial direction of tube 110. Each emitter 120 is joined on the inner wall surface of tube 110. Emitter 120 is formed in a shape which can easily make close contact with tube 110. For example, in a cross-section taken along the XZ plane, the shape of the surface of emitter 120 to be joined to the inner wall surface (second surface described later) of tube 110 is a substantially arc shape protruding toward the inner wall surface of tube 110 so as to be coincide with the inner wall surface of tube 110 at the time of water supply. Emitter 120 is disposed at a position where emitter 120 covers discharge port 130 of tube 110. It is to be noted that the X direction is the axial direction of tube 110 or the longitudinal direction of emitter 120, the Y direction is the short (width) direction of emitter 120, and the Z direction is the height direction of emitter 120.

Discharge port 130 is a hole which extends through the tube wall of tube 110. The hole diameter of discharge port 130 is, for example, 1.5 mm. It is to be noted that arrow F indicates the direction of flow of the irrigation liquid in tube 110.

Figure 2A:
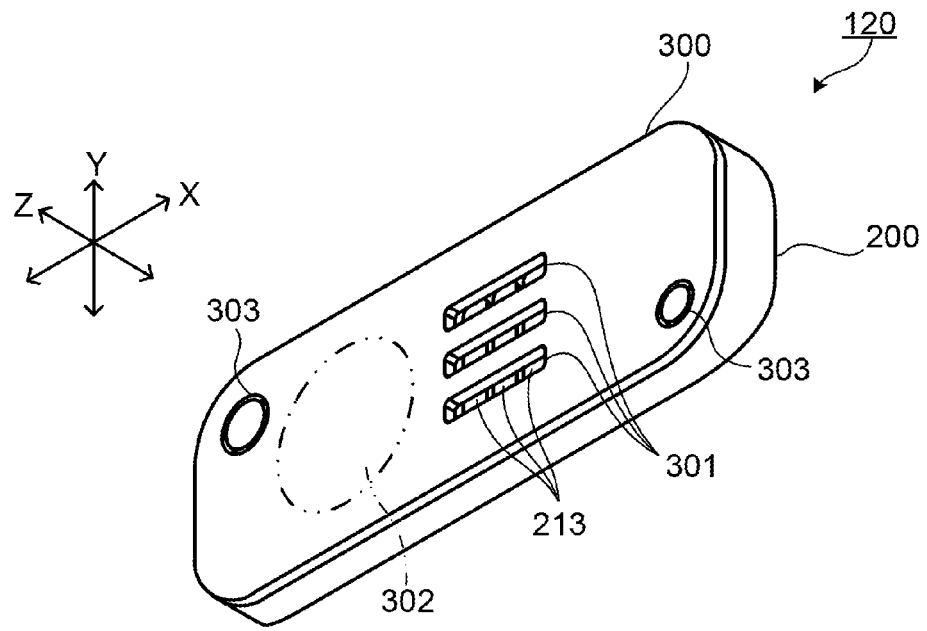
FIG. 2A illustrates a top surface, a front surface and a side surface of the emitter according to the embodiment.
Figure 2B:
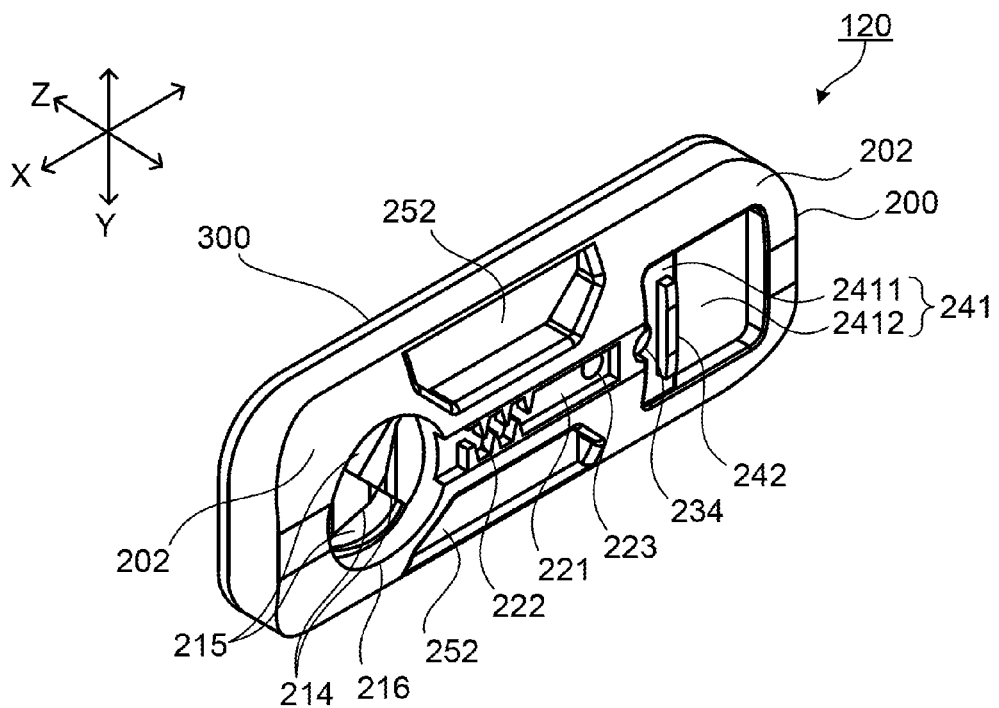
FIG. 2B illustrates a bottom surface, a front surface and a side surface of the emitter.
Figure 3A:
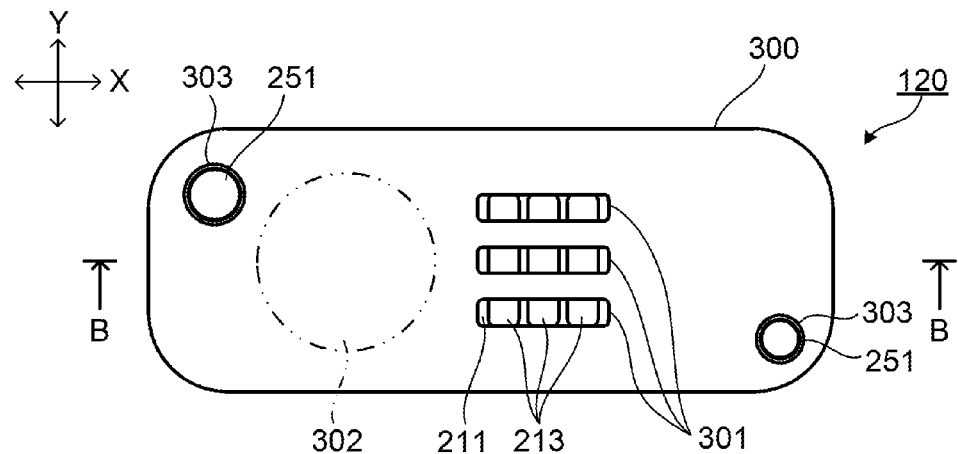
FIG. 3A is a plan view of the emitter according to the embodiment.
Figure 3B:
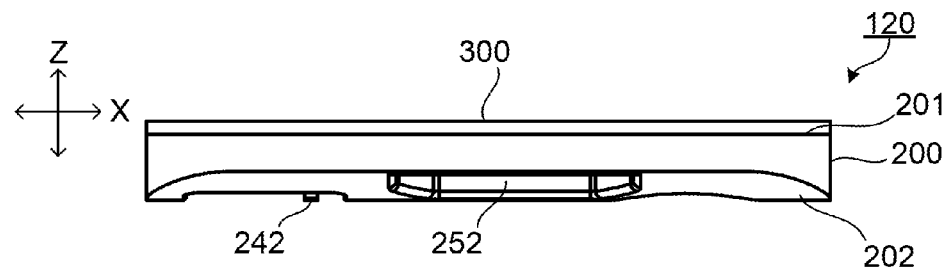
FIG. 3B is a front view of the emitter.
Figure 3C:
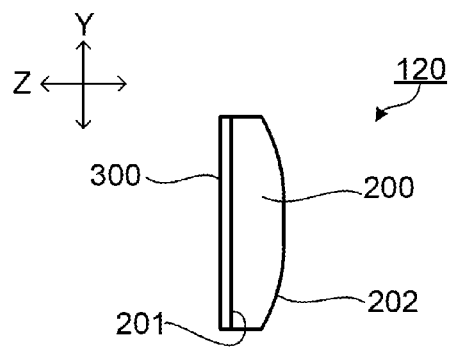
FIG. 3C is a side view of the emitter.
Figure 4A:
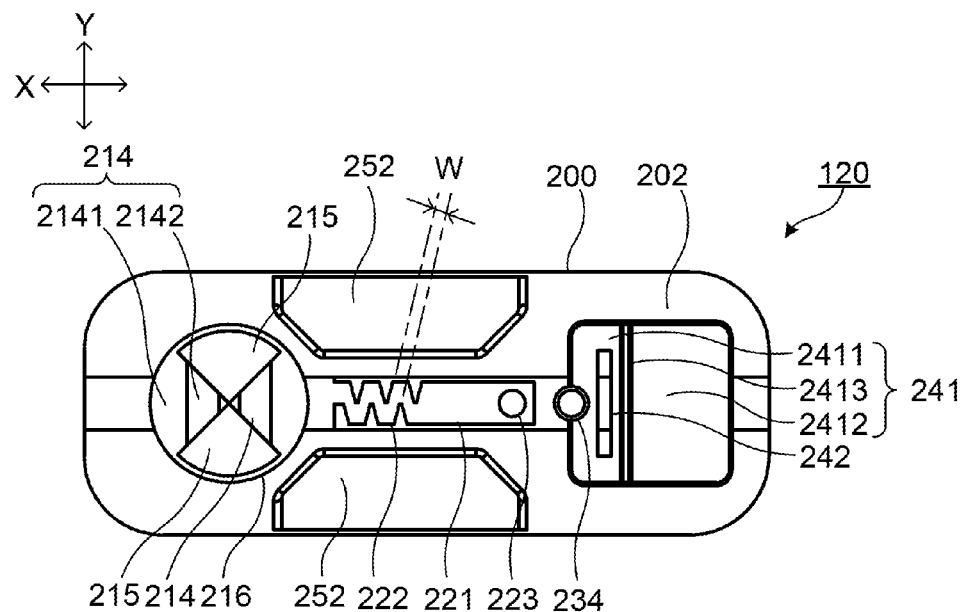
FIG. 4A is a bottom view of the emitter according to the embodiment.
Figure 4B:
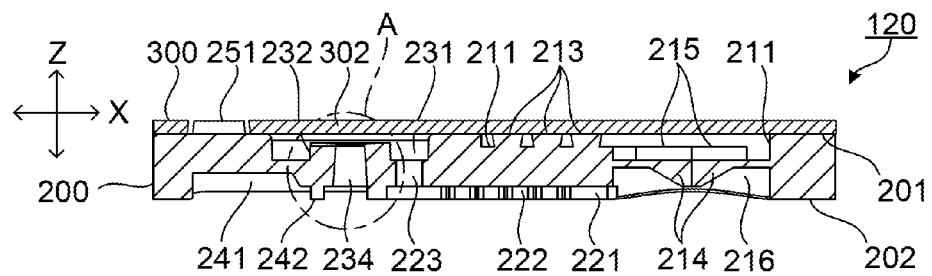
FIG. 4B is a sectional view of the emitter taken along line B-B of FIG. 3A.

FIG. 2A illustrates a top surface, a front surface and a side surface of emitter 120, and FIG. 2B illustrates a bottom surface, a front surface and a side surface of emitter 120. In addition, FIG. 3A is a plan view of emitter 120, FIG. 3B is a front view of emitter 120, and FIG. 3C is a side view of emitter 120. In addition, FIG. 4A is a bottom view of emitter 120, and FIG. 4B is a sectional view of emitter 120 taken along line B-B of FIG. 3A.

As illustrated in FIG. 2A and FIG. 2B, emitter 120 has a rectangular external shape. The shape in plan view (the shape along the Z direction) of emitter 120 is a substantially rectangular whose each corner is chamfered into a round form, and the lateral shape (the shape along the X direction) of emitter 120 is a shape (bell shape) composed of a semicircle and a rectangular continuous from the semicircle as described above. For example, the length of emitter 120 is 26 mm in the X direction, 10 mm in the Y direction, and 2.5 mm in the Z direction.

Emitter 120 includes emitter main body 200 to be joined to the inner wall surface of tube 110, and film 300 which is joined to emitter main body 200. First, film 300 is described.

Film 300 includes slit 301, diaphragm part 302 and positioning holes 303. Slit 301 is a slender opening extending along the X direction. Three slits 301 are disposed in parallel to each other at positions where the slits overlap protrusion line 213 described later film 300. Film 300 has a thickness of, for example, 0.5 mm.

Diaphragm part 302 is a portion of film 300 which is provided to overlap recess 231 and protrusion 232 described later. Diaphragm part 302 has a thickness equal to the thickness of other portions of film 300, and has a circular shape in plan view. It is to be noted that the thickness of diaphragm part 302 can be determined by a computer simulation or an experiment using a trial product or the like on the basis of the deformation amount under a pressure described later, for example.

Positioning holes 303 are two holes having a circular shape in plan view which extend through film 300, and for example, positioning holes 303 are disposed at positions corresponding to a pair of opposite corners on a diagonal line of film 300.

Next, emitter main body 200 is described. FIG. 5A illustrates a top surface, a front surface and a side surface of a molded article in the state where film 300 is joined to emitter main body 200, and FIG. 5B illustrates a bottom surface, a front surface and a side surface of the molded article. In addition, FIG. 6A is a plan view of the above-mentioned molded article, and FIG. 6B is a bottom view of the molded article.

As illustrated in FIG. 5A and FIG. 5B, emitter main body 200 includes first surface 201 and second surface 202. First surface 201 is one surface which is joined to film 300 in the Z direction. Second surface 202 is the other surface which is joined to the inner wall surface of tube 110 in the Z direction. First surface 201 is a planar surface, and second surface 202 is a non-planar surface having a substantially half cylindrical shape.

Figure 6A:
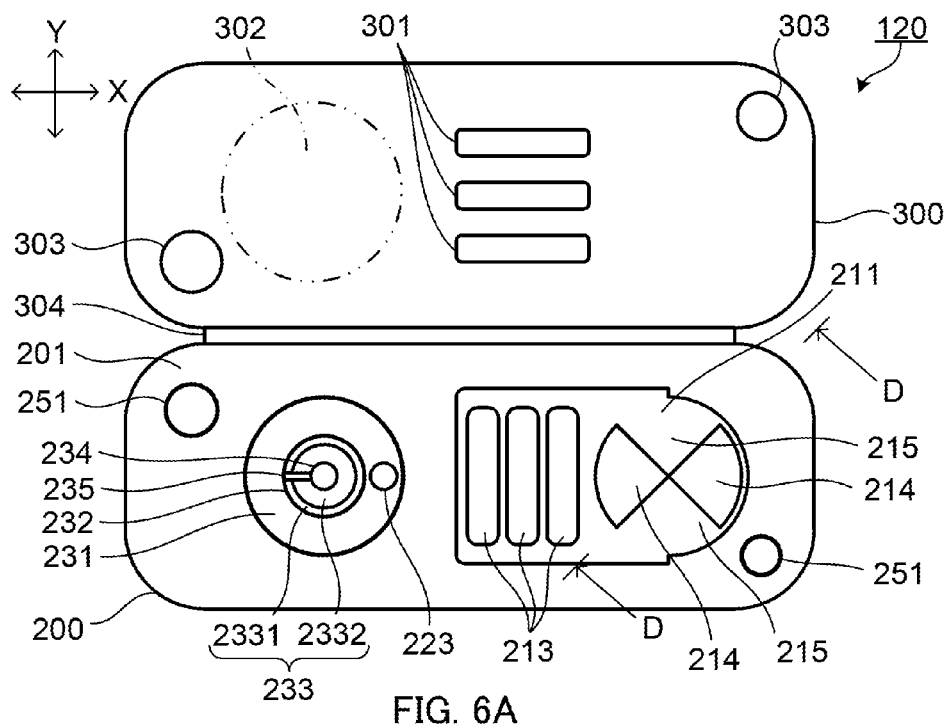
FIG. 6A is a plan view of the molded article in a state before a film is joined to an emitter main body in the embodiment.
Figure 6B:
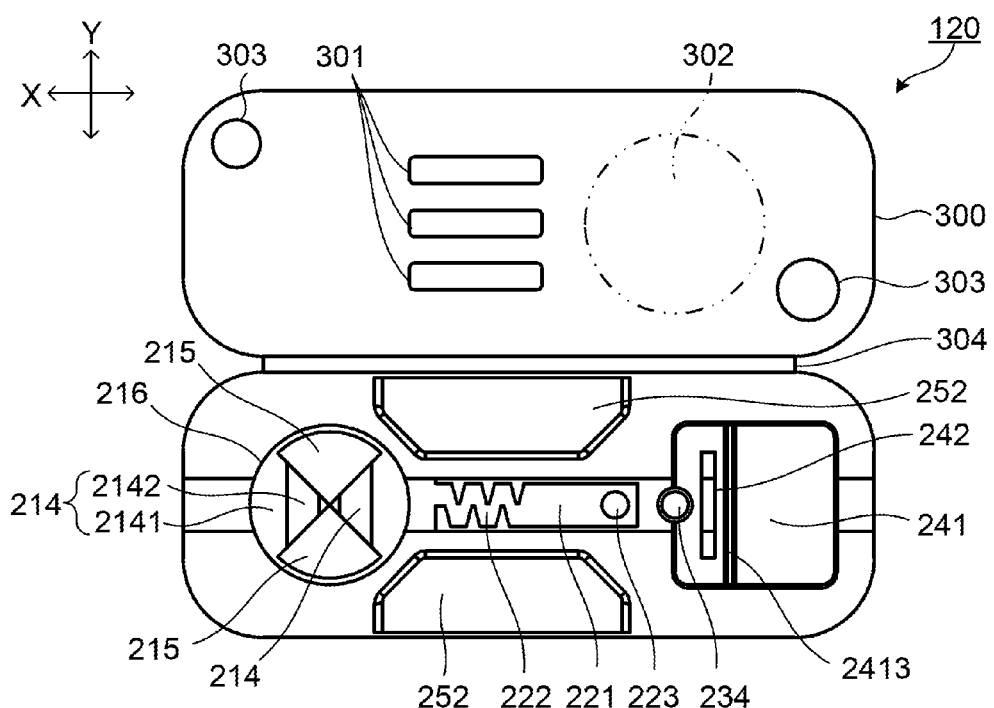
FIG. 6B is a bottom view of the molded article.

As illustrated in FIG. 5A, FIG. 6A and FIG. 6B, emitter main body 200 is integrally disposed with film 300 through hinge part 304. Hinge part 304 is disposed at an edge of first surface 201 of emitter main body 200 in the Y direction. For example, hinge part 304 is a portion having a thickness equal to that of film 300 and a width of 0.5 mm, and is formed integrally with emitter main body 200 and film 300.

As illustrated in FIG. 5A and FIG. 5B, emitter main body 200 includes recess 211, protrusion line 213 disposed in recess 211, valve element 214 and fixed part 215 formed on the bottom surface of recess 211, and recess 216 provided from second surface 202 to valve element 214 and fixed part 215. It is to be noted that an intake part is composed of slit 301, recess 211 and protrusion line 213. A liquid receiving amount regulating part is composed of valve element 214 and fixed part 215.

In plan view, recess 211 has a bell shape composed of a rectangular and a semicircle continuous from one side of the rectangular, and the depth of recess 211 from first surface 201 is, for example, 0.5 mm. The diameter of the semicircle part of the bell shape is, for example, 6 mm.

Protrusion line 213 is three slender protrusions which are disposed in the rectangular part of recess 211 in plan view in parallel to each other whose longitudinal direction is aligned with the Y direction. The height of protrusion line 213 from the bottom surface of recess 211 to the tip end of protrusion line 213 is, for example, 0.5 mm. A gap is provided between protrusion lines 213 or between protrusion line 213 and the wall surface of recess 211 in the X direction, and in addition, a gap is provided between the end portion of protrusion line 213 and the wall surface of recess 211 in the Y direction. As illustrated in FIG. 4B, protrusion line 213 is formed to have a shape in which the base end portion is narrower than the tip end portion in a cross-section taken along the XZ plane. That is, the gap between protrusion lines 213 or between protrusion line 213 and the wall surface of recess 211 in the X direction increases as the depth of recess 211 increases. The angle of the wall surface of protrusion line 213 to the bottom surface of recess 211 is, for example, 80 to 84°. Thus, protrusion line 213 forms a so-called wedge wire structure in recess 211.

In plan view, each of valve element 214 and fixed part 215 is a circular sector which is obtained by dividing a circle into four parts, and valve element 214 and fixed part 215 are alternately disposed in the circumferential direction. Fixed part 215 is composed of a flat plate, and one surface of the flat plate is flush with the bottom surface of recess 211. The arc portion of valve element 214 is a fixed end, and the radius of valve element 214 is a free end. Valve element 214 is disposed at a position depressed by the thickness of fixed part 215 from the bottom surface of recess 211. That is, the free end edge of valve element 214 on the upstream side is in contact with the free end edge of fixed part 215 on the downstream side. Valve element 214 and fixed part 215 are disposed at positions where the free ends of valve element 214 and fixed part 215 intersect with each other at 45° with respect to the X direction or the Y direction in plan view.

As illustrated in FIG. 6B, valve element 214 is composed of flexible thin part 2141 extending from the fixed end and thick part 2142 extending from thin part 2141. The thickness of thin part 2141 is uniform from the arc as the fixed end, and is sufficiently thin relative to fixed part 215.

The thickness of thick part 2142 is greater than the thickness of thin part 2142 on a downstream side of the valve element 214. Thick part 2142 has a substantially triangular pyramidal shape protruding toward recess 216, for example. The bottom surface of thick part 2142 has a rectangular equilateral triangular shape with the vertex at the center of the circular sector of valve element 214, and has two wall surfaces provided in an upright manner from the free end on the downstream side, and a tilted surface obliquely extending from the hypotenuse of the rectangular triangle toward the downstream side. In plan view, the boundary between thin part 2141 and thick part 2142 is a straight line. The apex of thick part 2142 is slightly cut out such that, for example, the distance between the inner wall surface of tube 110 and thick part 2142 is about 0.5 mm when emitter 120 is joined to tube 110.

In plan view, recess 216 has a circular shape whose diameter is equal to that of the semicircle of the bell shape of recess 211, and the bottom part thereof is composed of valve element 214 and fixed part 215, as illustrated in FIG. 5B.

As illustrated in FIG. 5B and FIG. 6B, emitter main body 200 includes recess 221. Recess 221 is a groove extending along the X direction on second surface 202. One end of recess 221 is in communication with recess 216, and recess 221 has a substantially rectangular shape in plan view. The depth of recess 221 from second surface 202 is, for example, 0.5 mm. Recess 221 includes pressure reduction channel part 222 (pressure reduction part) and hole 223.

In plan view, pressure reduction channel part 222 is a portion formed as a groove having a zigzag shape. In the zigzag shape, protrusions having a substantially triangular prism shape protruding from the side surface of recess 221 are alternately disposed along the longitudinal direction (the X direction) of recess 221. In plan view, the protrusions are disposed such that the tip of each protrusion does not exceed the central axis of recess 221. Pressure reduction channel part 222 has a depth of, for example, 0.5 mm, and the channel of pressure reduction channel part 222 has a width (W in FIG. 4A) of, for example, 0.5 mm.

Hole 223 opens at the other end part of recess 221, and extends through emitter main body 200.

As illustrated in FIG. 5A and FIG. 6A, emitter main body 200 includes recess 231, protrusion 232, end surface 233, hole 234 and groove 235. A discharge rate regulating part is composed of diaphragm part 302, protrusion 232, end surface 233, hole 234 and groove 235.

Recess 231 is a bottomed recess which opens to first surface 201. In plan view, recess 231 has a circular shape, and hole 234 opens at the bottom of recess 231. The circular shape has a diameter of, for example, 6 mm, and first surface 201 has a depth from recess 231 of, for example, 2 mm.

Protrusion 232 is a substantially cylindrical thick body which is uprightly provided at a center portion of the bottom of recess 231. The height of protrusion 232 is smaller than the depth of recess 231. For example, the distance from first surface 201 to protrusion 232 in the Z direction is 0.25 mm.

Figure 8A:
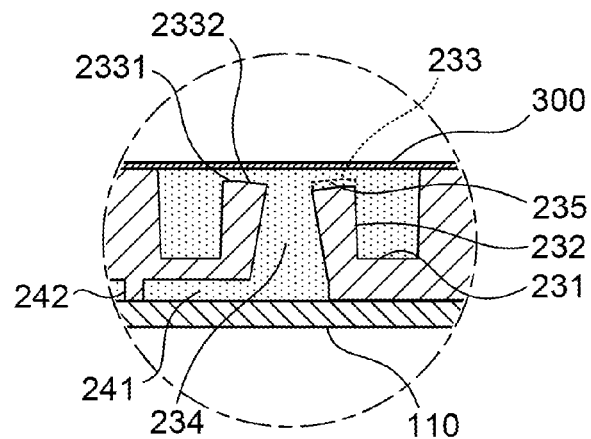
FIG. 8A illustrates part A of FIG. 4B in an enlarged manner of the emitter according to the embodiment in the case where the pressure of the irrigation liquid in the tube is equal to or higher than a first predetermined value.

End surface 233 is a tip end surface of protrusion 232. In plan view, end surface 233 has a circular shape, and has a diameter of, for example, 3 mm. End surface 233 includes outer ring part 2331 which is parallel to the XY plane, and tilted surface 2332 which is tilted to second surface 202 side from the inner peripheral edge of outer ring part 2331 toward the center portion of end surface 233 (FIG. 8A).

Tilted surface 2332 is a curved surface which is slightly depressed with respect to first surface 201 side. Tilted surface 2332 is formed to overlap a virtual curve which is in contact with the opening edges of recess 231 in a cross-section including the central axis of recess 231. The virtual curve includes a curve which is defined by diaphragm part 302 when the irrigation liquid in tube 110 receives a pressure having a value equal to or higher than a predetermined value in the above-mentioned cross-section (FIG. 8A and FIG. 8C). The curve has curvature radius R of 12 mm for example. Thus, tilted surface 2332 is a valve seat part on which diaphragm part 302 can sit.

Hole 234 opens at a center of end surface 233, and extends through emitter main body 200. Hole 234 is a tapered hole whose diameter gradually increases from end surface 233 side toward recess 241 side in the Z direction. The opening of hole 234 on end surface 233 side is smaller than the opening of hole 234 on recess 241 side, and the hole diameter of hole 234 on end surface 233 side is, for example, 1 mm.

Groove 235 is formed on end surface 233 in a range from the outer peripheral edge of end surface 233 to hole 234. That is, groove 235 communicates between recess 231 and hole 234. One or more grooves 235 may be provided. For example, groove 235 has a width of 2 mm, and a depth of 0.05 mm.

As illustrated in FIG. 5B and FIG. 6B, emitter main body 200 includes recess 241 and protrusion line 242. Recess 241 is a discharge part configured to face discharge port 130.

In plan view, recess 241 has a substantially rectangular shape. To be more specific, in plan view, recess 241 has a shape composed of a combination of first portion 2411 on recess 221 side in the X direction, second portion 2412 having a greater depth, tilted part 2413 which connects first portion 2411 and second portion 2412, and hole 234 which opens at an edge of first portion 2411 on recess 221 side. Thus, in plan view, recess 241 has a shape in which a semicircle of hole 234 is connected to one side of a rectangular. In plan view, each of first portion 2411 and second portion 2412 has a substantially rectangular shape. The inclination angle of tilted part 2413 to the bottom surface of second portion 2412 is, for example, 60°.

Protrusion line 242 is provided at first portion 2411 along the boundary to tilted part 2413. The height of protrusion line 242 is equal to the depth of first portion 2411. In the X direction, protrusion line 242 is separated from hole 234. In the Y direction, the length of protrusion line 242 is smaller than the length of first portion 2411, and each of both ends of protrusion line 242 is separated from the inner wall surface of first portion 2411. Thus, protrusion line 242 is disposed to completely overlap hole 234 as viewed from second portion 2412 side along the X direction.

In addition, emitter main body 200 includes protrusion 251 protruding from first surface 201 as illustrated in FIG. 5A and FIG. 6A, and recess 252 which opens at second surface 202 as illustrated in FIG. 5B and FIG. 6B.

In plan view, protrusion 251 has a circular shape, and has a size which fits with the positioning hole 303 of film 300. Each protrusion 251 is disposed at a position corresponding to positioning hole 303.

Each recess 252 is disposed between recess 216 and recess 241 in the X direction, and between recess 221 and the side edge of emitter main body 200 in the Y direction.

Each of emitter main body 200 and film 300 is molded with one material having flexibility such as polypropylene, for example. Examples of the material include resin and rubber, and examples of the resin include polyethylene and silicone. The flexibility of emitter main body 200 and film 300 can be adjusted with use of elastic resin materials, and for example, can be adjusted by the type of an elastic resin, the mixing ratio of an elastic resin material to a hard resin material, and the like. An integrally molded member of emitter main body 200 and film 300 can be manufactured by injection molding, for example.

Emitter 120 is composed by turning film 300 about hinge part 304 so as to join film 300 to first surface 201 of emitter main body 200. For example, film 300 is joined to emitter main body 200 by welding of a resin material of emitter main body 200 or film 300, by bonding using an adhesive agent, by pressure bonding of film 300 to emitter main body 200 or the like. By joining film 300 to first surface 201, recess 231 is liquid-tightly sealed with diaphragm part 302, and recess 231 becomes a part of a channel of irrigation liquid in emitter 120. In this manner, the above-mentioned serial channel from recess 211 to recess 241 is formed. It is to be noted that hinge part 304 may be left as it is, or may be removed by cutting off hinge part 304.

Trickle irrigation tube 100 is composed by joining second surface 202 of emitter 120 to the inner wall surface of tube 110. Emitter 120 is joined to the internal surface of tube 110 by welding of the resin material of emitter main body 200 or tube 110, by bonding using adhesive agent, by pressure bonding of emitter main body 200 to tube 110, or the like. Discharge port 130 is formed to open at second portion 2412 in emitter 120. While discharge port 130 is normally formed after emitter 120 is joined to tube 110, discharge port 130 may be formed before emitter 120 is joined to tube 110.

Next, flow of irrigation liquid in emitter 120 is described. First, water is supplied into tube 110 as irrigation liquid, for example. Examples of the irrigation liquid include water, liquid fertilizer, agricultural chemicals and mixtures thereof. Supply of water to trickle irrigation tube 100 is performed in a range where the pressure of the water does not exceed 0.1 MPa in view of preventing damaging of tube 100 and emitter 120. The water in tube 110 passes through slit 301 of film 300, and through a gap between recess 211 and protrusion line 213.

Since the longitudinal direction of slit 301 and the longitudinal direction of protrusion line 213 intersect with each other, the openings of recess 211 to tube 110 are scattered and the planar dimension of each opening is small. Thus, intrusion of floating materials in the water in tube 110 to recess 211 is suppressed. In this manner, slit 301, protrusion line 213 and recess 211 also serve as a screen part for catching the floating materials in the water flowing into emitter 120 from the inside of tube 110. In addition, since protrusion line 213 forms a so-called wedge wire structure, pressure drop of the water flowing into recess 211 is suppressed.

Figure 7A:
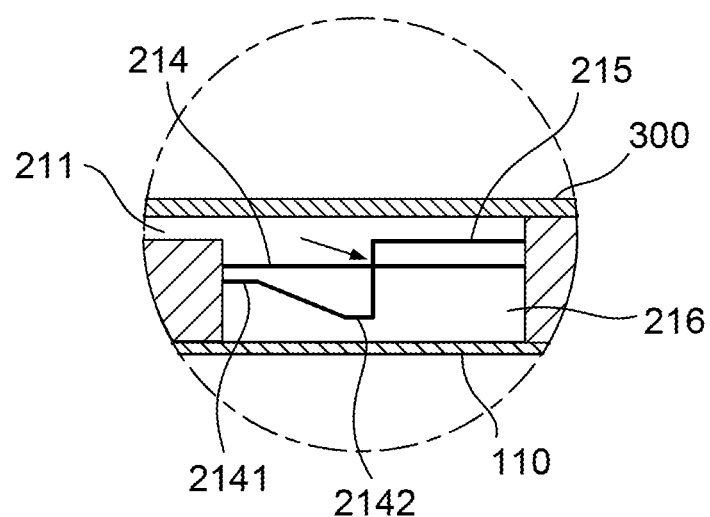
FIG. 7A illustrates a cross-section of the emitter according to the embodiment taken along line D-D of FIG. 6A in an enlarged manner in the case where the pressure of the irrigation liquid in the tube is lower than a predetermined value.
Figure 7B:
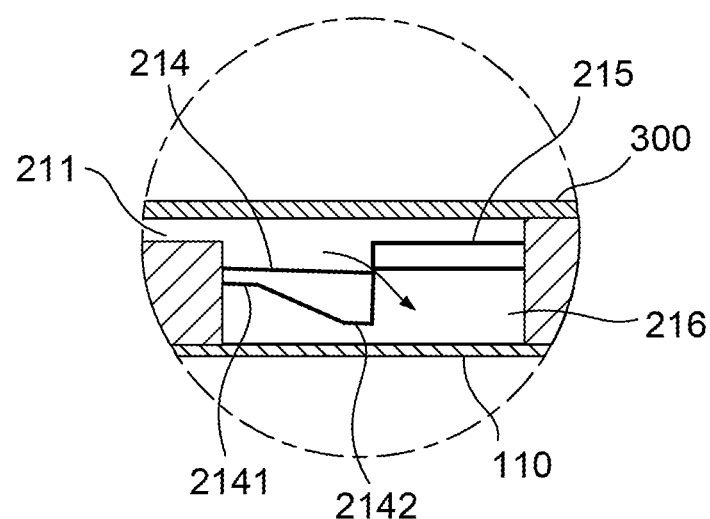
FIG. 7B illustrates a cross-section of the emitter taken along line D-D of FIG. 6A in an enlarged manner in the case where the pressure of the irrigation liquid in the tube is equal to or higher than predetermined value.

The water in recess 211 reaches the positions of valve element 214 and fixed part 215 in recess 211. FIG. 7A illustrates a cross-section of value emitter 120 taken along line D-D of FIG. 6A in an enlarged manner in the case where the pressure of the water in tube 110 is lower than a predetermined value, and FIG. 7B illustrates a cross-section of emitter 120 taken along line D-D of FIG. 6A in an enlarged manner in the case where the pressure of the water in tube 110 is equal to or higher than predetermined value. The arrows in FIGS. 7A and 7B indicate the flow of the water.

The water in recess 211 presses valve element 214 and fixed part 215 from recess 211 side toward recess 216. As illustrated in FIG. 7A, when the water pressure in recess 211 is lower than a predetermined value (for example, 0.005 MPa), both valve element 214 and fixed part 215 do not bend to recess 216 side, and the water channel is closed by valve element 214 and fixed part 215.

As illustrated in FIG. 7B, since thin part 2141 is thinner than fixed part 215, when the water pressure in recess 211 is equal to or higher than the predetermined value, only thin part 2141 bends whereas fixed part 215 does not bend, and, only valve element 214 opens to recess 216 side whereas fixed part 215 does not open to recess 216 side. In this manner, a gap is formed between valve element 214 and fixed part 215, and the water in recess 211 is supplied to recess 216 through the gap.

The water in recess 216 is supplied to pressure reduction channel part 222 through recess 221. The pressure of the water flowing through pressure reduction channel part 222 is reduced as a result of pressure reduction caused by the shape (zigzag shape) in plan view of pressure reduction channel part 222. In addition, floating materials in the water are entangled in the turbulent flow generated between the protrusions of pressure reduction channel part 222 and are retained in pressure reduction channel part 222. In this manner, the floating materials are further removed from the water by pressure reduction channel part 222.

The water having passed through pressure reduction channel part 222 in which the pressure is reduced and the floating materials are removed is supplied into recess 241 through hole 223.

Figure 8B:
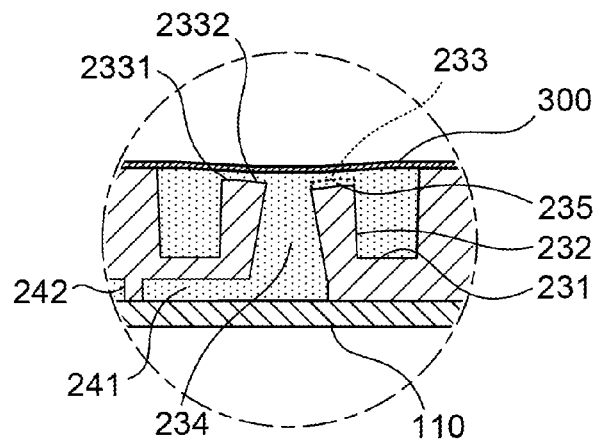
FIG. 8B illustrates the part A of the emitter in an enlarged manner in the case where the pressure in the tube is equal to or higher than the first predetermined value and lower than the second predetermined value.
Figure 8C:
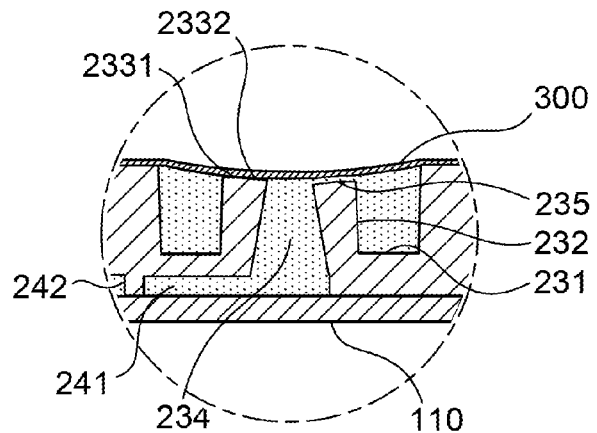
FIG. 8C illustrates the part A of the emitter in an enlarged manner in the case where the pressure in the tube is equal to or higher than the second predetermined value.

Here, FIG. 8A illustrates part A of FIG. 4B in an enlarged manner in the case where the water pressure in tube 110 is equal to or higher than first predetermined value, FIG. 8B illustrates the part A in an enlarged manner in the case where the water pressure in tube 110 is equal to or higher than the first predetermined value and lower than the second predetermined value, and FIG. 8C illustrates the part A in an enlarged manner in the case where the water pressure in tube 110 is equal to or higher than the second predetermined value.

When recess 241 is filled with the water, the water is supplied to hole 234 through a gap between film 300 and end surface 233 as illustrated in FIG. 8A. When the water pressure in tube 110 is equal to or higher than the first predetermined value (for example, 0.02 MPa), the flow rate of the water at the intake part increases and the amount of the water supplied to recess 231 increases, as the water pressure in tube 110 increases.

Meanwhile, when the water pressure in tube 110 is equal to or higher than the first predetermined value, diaphragm part 302 is pushed and bent by the water in tube 110 to recess 231 side as illustrated in FIG. 8B. As a result, the distance between diaphragm part 302 and end surface 233 decreases. For example, the distance between end surface 233 and diaphragm part 302 is changed to 0.15 mm. Consequently, the amount of the water which flows through the gap between end surface 233 and diaphragm part 302 decreases.

As illustrated in FIG. 8C, when the pressure of the irrigation liquid in tube 110 is equal to or higher than the second predetermined value (for example, 0.05 MPa), diaphragm part 302 is further pushed to recess 231 side and further bent to make close contact with tilted surface 2332. While hole 234 is sealed with diaphragm part 302, end surface 233 includes groove 235, and thus groove 235 communicates between recess 231 and hole 234. Consequently, the water in recess 231 is supplied from recess 231 to hole 234 through groove 235. Consequently, when the water pressure is high, the flow rate of the water at hole 234 is restricted to a constant flow rate which can pass through groove 235.

The water having passed through hole 234 is supplied to recess 241. That is, the water having passed through hole 234 is, first, supplied to first portion 2411, and then supplied to second portion 2412 through the gap between the inner wall surface of recess 241 and protrusion line 242. The water supplied to second portion 2412 flows out of tube 110 through discharge port 130 which opens at second portion 2412. Protrusion line 242 is disposed at a position on a straight line connecting hole 234 and discharge port 130 when emitter 120 is joined to tube 110, and protrusion line 242 causes bypassing of the flow of the water flowing from hole 234 to discharge port 130. Thus, protrusion line 242 serves as a flow guide member which controls the flow of the water at recess 241 in the above-mentioned manner.

It is to be noted that, when trickle irrigation tube 100 is used, the roots of the plant may intrude into recess 241 of discharge port 130 for water. Such intrusion of foreign matters is blocked by protrusion line 242. Consequently, it is possible to prevent hole 234 from being closed by foreign matters. In this manner, the discharge part includes an intrusion prevention part (protrusion line 242) for preventing intrusion of foreign matters from discharge port 130.

As described, emitter 120 is an emitter for quantitatively discharging irrigation liquid (water) in tube 110 for distributing the irrigation liquid from discharge port 130 communicating between an inside and an outside of tube 110 when emitter 120 is joined to an inner wall surface of tube 110 at a position corresponding to discharge port 130, emitter 120 being composed of a resin molded body including at least recess 211 and a through hole and configured to be joined to an inner wall surface of tube 110 configured to distribute the irrigation liquid at a position corresponding to discharge port 130, emitter 120 including: an intake part for receiving the irrigation liquid in tube 110; a liquid receiving amount regulating part for regulating a flow rate of the irrigation liquid received from the intake part in accordance with a pressure of the irrigation liquid in the intake part; pressure reduction part 222 for allowing the irrigation liquid supplied from the liquid receiving amount regulating part to flow therethrough while reducing the pressure of the irrigation liquid; a discharge rate regulating part for regulating the flow rate of the irrigation liquid supplied from pressure reduction part 222 in accordance with a pressure of the irrigation liquid in tube 110; and discharge part 130 to which the irrigation liquid, having a flow rate regulated by the discharge rate regulating part, is supplied, discharge part 130 being to be facing discharge port 130, in which: the intake part includes a screen part for catching a floating material in the irrigation liquid, the screen part includes: slit 301 which opens to inside of tube 110, recess 211 which is in communication with slit 301 and extends in a direction intersecting with a longitudinal direction of slit 301, and discharge part 130 includes an intrusion prevention part for preventing intrusion of foreign matter from discharge port 130.

Thus, since emitter 120 includes the liquid receiving amount regulating part and the discharge rate regulating part, emitter 120 can stabilize the discharge rate of the water of tube 110 from emitter 120 in accordance with the water pressure in tube 110.

In addition, since emitter 120 includes the screen part, intrusion of floating materials in the water in tube 110 to emitter 120 can be prevented, and, since emitter 120 includes the intrusion prevention part, intrusion of foreign matters from discharge port 130 to emitter 120 can be prevented. Thus, water can stably flow in emitter 120 with a desired flow rate.

In addition, the configuration in which film 300 has slit 301 which intersects with protrusion line 213 in recess 211 in plan view is effective in readily forming a large number of entrances of the channel in emitter 120 each having a small planar dimension, and in addition, is effective from the viewpoint of preventing intrusion of the floating materials of the water in tube 110 to emitter 120.

Further, since the above-described components of emitter 120 in emitter main body 200 are composed of a recess and a through hole formed on emitter main body 200, emitter main body 200 having the components can be integrally produced by injection molding. Therefore, the manufacturing cost of emitter 120 can be further reduced in comparison with conventional emitters composed of three parts.

In addition, the configuration in which the screen part includes a so-called wedge wire structure in which the width of the recess increases as the depth of the recess increases is further effective from the viewpoint of suppressing pressure drop on the downstream side of the screen part when the screen part catches foreign matters.

In addition, the liquid receiving amount regulating part includes valve element 214 which extends from the fixed end in the channel in emitter 120 and which opens to the downstream side under pressure of the water on the upstream side. In this configuration, valve element 214 includes flexible thin part 2141 extending from the fixed end, and thick part 2142 extending from thin part 2141, and, when the water pressure on the upstream side of the liquid receiving amount regulating part is equal to or higher than a predetermined value, thin part 2141 bends and valve element 214 opens to the downstream side. With this configuration, when the water pressure in tube 110 is low, inflow of the water to emitter 120 can be stopped, and as a result, outflow of the water from discharge port 130 can be stopped. Therefore, this configuration is further effective from the viewpoint of stabilizing the discharge rate of the water in tube 110 by sufficiently and immediately maintaining a high pressure in tube 110.

In addition, the configuration in which the boundary between thick part 2142 and thin part 2141 has a straight line shape in plan view and the thickness of thick part 2142 is greater than the thickness of thin part 2141 on the downstream side of valve element 214 is further effective from the viewpoint of increasing the ease of opening of valve element 214 to the downstream side, the viewpoint of reducing the predetermined value for opening and closing valve element 214, and the viewpoint of more precisely performing the opening and closing of valve element 214.

In addition, the configuration in which the liquid receiving amount regulating part further includes fixed part 215 disposed at a position adjacent to valve element 214 in plan view, each of valve element 214 and fixed part 215 has a circular sector shape in plan view, and valve element 214 and fixed part 215 are alternately disposed in the circumferential direction in plan view is further effective from the viewpoint of increasing the productivity of emitter main body 200 by injection molding.

In addition, the discharge rate regulating part includes: film 300 having flexibility and disposed to block a communication of a channel on a downstream side of pressure reduction part 222 and the inside of tube 110, end surface 233 depressed with respect to the film 300 and disposed at the channel on the downstream side of pressure reduction part 222 without making contact with the film 300, the end surface 233 being capable of making close contact with the film 300, hole 234 which opens to the end surface 233 and is in communication with the discharge part, groove 235 formed at the end surface 233 and communicating between the hole 234 and the channel located outside relative to the end surface 233, and the film 300 makes close contact with the end surface 233 when a pressure of the irrigation liquid in the tube 110 is equal to or higher than a predetermined value. This configuration is further effective from the viewpoint of preventing water from excessively flowing out from emitter 120 when the water pressure in tube 110 is high such that the water is stably discharged from emitter 120 with a desired amount regardless of the water pressure in tube 110.

In addition, the configuration in which end surface 233 includes tilted surface 2332 which can make close contact with diaphragm part 302 deformed by the water pressure in tube 110 is further effective from the viewpoint of stably discharging the water from emitter 120 at a desired rate.

In addition, the configuration in which the discharge part includes hole 234 for supplying the water to the discharge part, the intrusion prevention part is disposed at a position on a straight line connecting hole 234 and discharge port 130 when emitter 120 is joined to tube 110 and is protrusion line 242 (flow guide member) which causes bypassing of the water flow from hole 234 to discharge port 130 is further effective from the viewpoint of preventing intrusion of plant roots to emitter 120.

In addition, with the configuration in which emitter 120 is molded with one material having flexibility and film 300 is integrally molded as a part of emitter 120, both of emitter main body 200 and film 300 can be molded as one component by injection molding, which is further effective from the viewpoint of preventing manufacturing error of the joining position of film 300, and further reducing manufacturing cost.

In addition, the configuration in which emitter main body 200 has a substantially arc cross-sectional shape as viewed in the YZ plane in second surface 202 is further effective from the viewpoint of increasing the joining strength of emitter 120 to the inner wall surface of tube 110.

In addition, the configuration in which film 300 includes positioning hole 303 and emitter main body 200 includes protrusion 251 is further effective from the viewpoint of further readily and correctly joining film 300 to a desired position, the viewpoint of increasing productivity, and the viewpoint of reducing variation in quality due to manufacturing error.

In addition, the configuration in which emitter main body 200 includes recess 252 (thickness-reducing hole) is further effective from the viewpoint of increasing the molding accuracy of emitter main body 200, the viewpoint of increasing productivity, and the viewpoint of ensuring desired quality.

In addition, the configuration in which each of valve element 214 and fixed part 215 adjacent to each other has a circular sector shape, and valve element 214 and fixed part 215 are disposed such that the free end edge of valve element 214 on the upstream side is in contact with the free end edge of fixed part 215 on the downstream side does not require cutting work of valve element 214 and fixed part 215 and is therefore further effective from the viewpoint of molding both of valve element 214 and fixed part 215 at one time only by injection molding.

In addition, the configuration in which recess 241 is composed of shallow first portion 2411 on the upstream side and deep second portion 2412 on the downstream side is effective from the viewpoint of preventing intrusion of plant roots from discharge port 130 to the upstream side, and the configuration in which protrusion line 242 is further disposed to first portion 2411 is further effective from the above-mentioned viewpoint.

It is to be noted that, as long as the above-described effect is achieved, the above-mentioned configurations of trickle irrigation tube 100 or emitter 120 may be partially changed, or trickle irrigation tube 100 or emitter 120 may further have other configurations.

For example, tube 110 may be a seamless tube, or a tube composed of slender sheet(s) joined together along the longitudinal direction.

In addition, discharge port 130 may be a gap formed at the above-mentioned joining part of the sheets so as to communicate between the inside and the outside of tube 110, or a pipe sandwiched by the sheets at the joining part. Further, the shape of the discharge port in the axial direction may not be a straight line shape. Examples of the tube having the discharge port include a tube in which a depression having a desired shape and serving as a channel is formed on the surface of the above-mentioned sheet(s), and a discharge port composed of the channel is formed at the joining part when the sheets are joined together.

While the intake part is located at a position on the upstream side in the flow direction of the water in tube 110, the intake part may be located at a position on the downstream side. In addition, the orientations of a plurality of emitters in one tube 110 may be identical to each other or different from each other.

In addition, the resin material of emitter main body 200 and the resin material of film 300 may be identical to each other or different from each other.

While emitter main body 200 is integrally molded by injection molding of resin, emitter main body 200 may be composed of two components of a first surface 201 side component and a second surface 202 side component. In this case, the components on the first surface 201 side are molded integrally with film 300. With the configuration in which emitter main body 200 is composed of the two components, a channel such as the pressure reduction channel can be disposed inside emitter main body 200. It is to be noted that the two components may be integrally molded through a hinge part.

While the screen part is composed of a plurality of parallel slits 301 and a plurality of parallel recesses extending in a direction intersecting with the longitudinal direction of slit 301, the number of each of slit 301 and the recess may be one. While the screen part includes the wedge wire structure, such a structure may not be included. For example, protrusion line 213 may be uprightly provided on the bottom of recess 211 at a right angle.

While the liquid receiving amount regulating part is composed of valve element 214 and fixed part 215, valve element 214 and fixed part 215 may not be alternately disposed in a plane direction (circumferential direction), or the liquid receiving amount regulating part may not include fixed part 215 and may be composed only of valve element 214. In addition, valve element 214 may be a segment having a uniform thickness as long as valve element 214 is a valve element which appropriately opens with a pressure equal to or higher than a predetermined water pressure.

In addition, the liquid receiving amount regulating part may have other structures. For example, the liquid receiving amount regulating part may be composed of a part which separates recess 211 and recess 216 from each other, and a plurality of pores which extend through the part or the pores and a protrusion such as a burr uprightly provided at the opening edge on the upstream side thereof. Also with this configuration, the liquid receiving amount can be appropriately regulated in accordance with the water pressure on the upstream side of the liquid receiving amount regulating part.

In addition, the pressure reduction part may have any configuration as long as the pressure reduction part can appropriately reduce the pressure of the water to be supplied to the discharge rate regulating part, and may be a channel having a linear shape in plan view, or, a channel whose planar dimension changes in accordance with the water pressure in tube 110, for example. In addition, the pressure reduction part may be a groove on first surface 201 which is covered with film 300 in emitter main body 200.

While the valve seat part of the present embodiment is tilted surface 2332 which forms a recessed surface part which can make close contact with diaphragm part 302, other suitable configurations may also be adopted as long as the valve seat part can make close contact with diaphragm part 302 at a position around hole 234, and for example, the valve seat part may be a plane surface part.

While, in the discharge rate regulating part, diaphragm part 302 directly performs opening and closing of channel (hole 234) in emitter 120, the discharge rate regulating part may also have a configuration in which a closure capable of opening and closing the channel in emitter 120 is opened and closed by bringing diaphragm part 302 close to the closure and separating diaphragm part 302 from the closure. Also with the discharge rate regulating part having such a configuration, the discharge rate can be appropriately regulated in accordance with the water pressure in tube 110.

In addition, as long as the intrusion prevention part can block intrusion of roots or the like from discharge port 130 to hole 234, the intrusion prevention part may not be the above-mentioned flow guide member. For example, the intrusion prevention part may be a grid member or a screen disposed at a position of the flow guide member, or a baffle plate which is disposed to guide the intruded roots to the side opposite to hole 234 from discharge port 130.

It is to be noted that second surface 202 may also be a planar surface.

This application is entitled to and claims the benefit of Japanese Patent Application No. 2013-245228 filed on Nov. 27, 2013, and Japanese Patent Application No. 2014-206476 filed on Oct. 7, 2014 the disclosure each of which including the specification, drawings and abstract is incorporated herein by reference in its entirety.

INDUSTRIAL APPLICABILITY

According to the present invention, an emitter which can drop liquid with an appropriate rate by the pressure of the liquid to be dropped can be easily provided. Accordingly, popularization of the above-mentioned emitter in technical fields such as trickle irrigations and endurance tests where long-term dropping is required, and further development of the technical fields can be expected.

REFERENCE SIGNS LIST

100 Trickle irrigation tube
110 Tube

120 Emitter
130 Discharge port
200 Emitter main body
201 First surface
202 Second surface
211, 216, 221, 231, 241, 252 Recess
213, 242 Protrusion line
214 Valve element
215 Fixed part
222 Pressure reduction channel part
223, 234 Hole
232, 251 Protrusion
233 End surface
235 Groove
300 Film
301 Slit
302 Diaphragm part
303 Positioning hole
304 Hinge part
2141 Thin part
2142 Thick part
2331 Outer ring part
2332 Tilted surface
2411 First portion
2412 Second portion
2413 Tilted part

The invention claimed is:

1. An emitter for quantitatively discharging irrigation liquid in a tube for distributing the irrigation liquid from a discharge port communicating between an inside and an outside of the tube when the emitter is joined to an inner wall surface of the tube at a position corresponding to the discharge port, the emitter being composed of a resin molded body including at least a recess and a through hole, the emitter comprising:
 an intake part for receiving the irrigation liquid in the tube;
 a liquid receiving amount regulating part for regulating a flow rate of the irrigation liquid received from the intake part in accordance with a pressure of the irrigation liquid in the intake part;
 a pressure reduction part for allowing the irrigation liquid supplied from the liquid receiving amount regulating part to flow therethrough while reducing the pressure of the irrigation liquid;
 a discharge rate regulating part for regulating the flow rate of the irrigation liquid supplied from the pressure reduction part in accordance with a pressure of the irrigation liquid in the tube; and
 a discharge part to which the irrigation liquid, having a flow rate regulated by the discharge rate regulating part, is supplied, the discharge part configured to face the discharge port, wherein:
 the intake part includes a screen part for catching a float material in the irrigation liquid,
 the screen part includes:
  a plurality of slits opening to an inside of the tube,
  a recess which is in communication with the slit,
  a plurality of protrusion lines disposed in the recess, the plurality of protrusion lines extending in a direction intersecting with a longitudinal direction of the slits,
  a plurality of gaps provided between the plurality of protrusion lines and between a wall surface of the recess and a protrusion line of the plurality of protrusion lines, the plurality of gaps being in communication with the slit and extending in a direction intersecting with a longitudinal direction of the slits, and
 the discharge part includes an intrusion prevention part for preventing intrusion of foreign matter from the discharge port.

2. The emitter according to claim 1, wherein a width of each of the plurality of gaps increases as a depth of the recess increases.

3. The emitter according to claim 1, wherein:
 the liquid receiving amount regulating part includes a valve element which extends from a fixed end of a channel of the irrigation liquid in the emitter and opens to a downstream side when receiving a pressure of the irrigation liquid on an upstream side,
 the valve element includes:
  a thin part having flexibility and extending from the fixed end, and
  a thick part extending from the thin part,
  wherein the thin part bends and the valve element opens to the downstream side when a pressure of the irrigation liquid on an upstream side of the liquid receiving amount regulating part is equal to or higher than a predetermined value.

4. The emitter according to claim 3, wherein:
 a boundary between the thick part and the thin part has a straight line shape in plan view, and
 a thickness of the thick part is greater than a thickness of the thin part on a downstream side of the valve element.

5. The emitter according to claim 3, wherein:
 the liquid receiving amount regulating part further includes a fixed part disposed at a position adjacent to the valve element in plan view,
 each of the valve element and the fixed part has a circular sector shape in plan view, and
 the valve element and the fixed part are alternately disposed in a circumferential direction in plan view.

6. The emitter according to claim 1, wherein:
 the discharge rate regulating part includes:
  a film having flexibility and disposed to block a communication of a channel on a downstream side of the pressure reduction part and the inside of the tube,
  a valve seat part depressed with respect to the film and disposed at the channel on the downstream side of the pressure reduction part without making contact with the film, the valve seat part being capable of making close contact with the film,
  a hole which opens at the valve seat part and is in communication with the discharge part, and
  a groove formed at the valve seat part and communicating between the hole and the channel located outside relative to the valve seat part, and
 the film makes close contact with the valve seat part when the pressure of the irrigation liquid in the tube is equal to or higher than a predetermined value.

7. The emitter according to claim 6, wherein:
 the emitter is molded with one material having flexibility, and
 the film is integrally molded as a part of the emitter.

8. The emitter according to claim 1, wherein:
 the discharge part includes a supply port for supplying the irrigation liquid to the discharge part, and
 the intrusion prevention part is a flow guide member disposed at a position on a straight line connecting the supply port and the discharge port when the emitter is joined to the tube, the flow guide member being configured to cause bypassing of flow of the irrigation liquid from the supply port to the discharge port.

9. A trickle irrigation tube comprising:

a tube, and at least one emitter for quantitatively discharging irrigation liquid in a tube for distributing the irrigation liquid from a discharge port communicating between an inside and an outside of the tube when the emitter is joined to an inner wall surface of the tube at a position corresponding to the discharge port, the emitter being composed of a resin molded body including at least a recess and a through hole, the emitter comprising:

an intake part for receiving the irrigation liquid in the tube;

a liquid receiving amount regulating part for regulating a flow rate of the irrigation liquid received from the intake part in accordance with a pressure of the irrigation liquid in the intake part;

a pressure reduction part for allowing the irrigation liquid supplied from the liquid receiving amount regulating part to flow therethrough while reducing the pressure of the irrigation liquid;

a discharge rate regulating part for regulating the flow rate of the irrigation liquid supplied from the pressure reduction part in accordance with a pressure of the irrigation liquid in the tube; and a discharge part to which the irrigation liquid, having a flow rate regulated by the discharge rate regulating part, is supplied, the discharge part configured to face the discharge port, wherein:

the intake part includes a screen part for catching a float material in the irrigation liquid, the screen part includes:

a plurality of slits opening to an inside of the tube, a recess which are in communication with the slit, a plurality of protrusion lines disposed in the recess, the plurality of protrusion lines extending in a direction intersecting with a longitudinal direction of the slits, a plurality of gaps provided between the plurality of protrusion lines and between an wall surface of the recess and a protrusion line of the plurality of protrusion lines, the plurality of gaps being in communication with the slit and extending in a direction intersecting with a longitudinal direction of the slits, and the discharge part includes an intrusion prevention part for preventing intrusion of foreign matter from the discharge port.

* * * * *